United States Patent [19]

Krutz

[11] 4,265,076
[45] May 5, 1981

[54] DEVICE FOR TREATING AGRICULTURAL PRODUCTS TO ENHANCE DRYING

[75] Inventor: Gary W. Krutz, West Lafayette, Ind.

[73] Assignee: Purdue Research Foundation, West Lafayette, Ind.

[21] Appl. No.: 124,631

[22] Filed: Feb. 25, 1980

Related U.S. Application Data

[63] Continuation of Ser. No. 901,067, Apr. 28, 1978, abandoned.

[51] Int. Cl.³ .............................................. A01D 45/00
[52] U.S. Cl. ................................. 56/14.4; 56/DIG. 1
[58] Field of Search ...................... 56/1, DIG. 1, 14.4; 34/60-71

[56] References Cited

U.S. PATENT DOCUMENTS

| | | | |
|---|---|---|---|
| 1,242,761 | 10/1917 | Blohm | 56/13.2 |
| 3,397,520 | 8/1968 | Johnston | 56/DIG. 1 |
| 3,940,910 | 3/1976 | d'Acremont | 56/14.4 |

Primary Examiner—Robert A. Hafer
Attorney, Agent, or Firm—John R. Nesbitt; Robert E. Harris

[57] ABSTRACT

A device is disclosed for treating agricultural products to enhance drying of the products by macerating the products and then forming the macerated products into a mat. The agricultural products, such as forage products and more particularly hay, are macerated by passing the products between two cylindrical rollers rotating in opposite directions at different speeds. The macerated products are then formed into a mat, if desired, by conveying the products between conveyor belts to a matting roller adjacent to one of the conveyor belts. The thus formed mat of macerated material permits drying of the products within a few hours.

30 Claims, 11 Drawing Figures

DEVICE FOR TREATING AGRICULTURAL PRODUCTS TO ENHANCE DRYING

RELATED INVENTION

This application is a continuation of U.S. application Ser. No. 901,067 filed Apr. 28, 1978, now abandoned.

FIELD OF THE INVENTION

This invention relates to a device for treating agricultural products and, more particularly, relates to a device for macerating forage products to enhance drying in a short period of time.

BACKGROUND OF THE INVENTION

For many agricultural products, it is necessary that such products be subjected to various treatments, including in some instances, drying of the products. This is particularly true for forage products, such as hay, and in the past, the farmer has been largely dependent upon the weather during a hay harvest since the hay has heretofore been commonly left in the field to dry. Obviously, if the weather is inclement, for any appreciable period of time, drying of the hay is impaired, and in some cases, the hay is damaged or lost.

While some attempts have been made to provide devices to promote fast drying of forage products, such devices have not been completely successful in achieving the desired degree of drying, require undesirably long drying periods, and/or fail to suggest a device with components that have been shown to be satisfactory for such a device to accomplish the desired degree of drying in a short time period.

SUMMARY OF THE INVENTION

This invention provides a device for treatment of agricultural products, such as forage products, to enhance drying of the products. The products are macerated by passing the product between two movable means one of which is moving at a faster rate of speed than the other one. The macerated products may then be formed into a mat with the desired drying occurring in a short period of time.

It is therefore an object of this invention to provide an improved device for treating agricultural products to enhance drying.

It is still another object of this invention to provide an improved device for macerating agricultural products.

It is yet another object of this invention to provide an improved device for enhancing drying of forage products by macerating the products.

It is yet another object of this invention to provide an improved device for treating forage products to enhance drying within a short period of time.

It is still another object of this invention to provide an improved device for macerating agricultural products by passing the products between movable elements moving at different rates of speed.

It is yet another object of this invention to provide an improved device for macerating agricultural products by passing the products between rollers rotating in opposite directions at different speeds.

It is yet another object of this invention to provide an improved device for treating forage products by macerating the products and then forming a mat therefrom to enhance drying.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiments of the herein disclosed invention are meant to be included as come within the scope of the claims.

BRIEF DESCRIPTION OF THE DRAWINGS

The accompanying drawings illustrate two complete embodiments of the invention according to the best mode so far devised for the practical application of the principles thereof, and in which.

DESCRIPTION OF THE INVENTION

Figure 1:
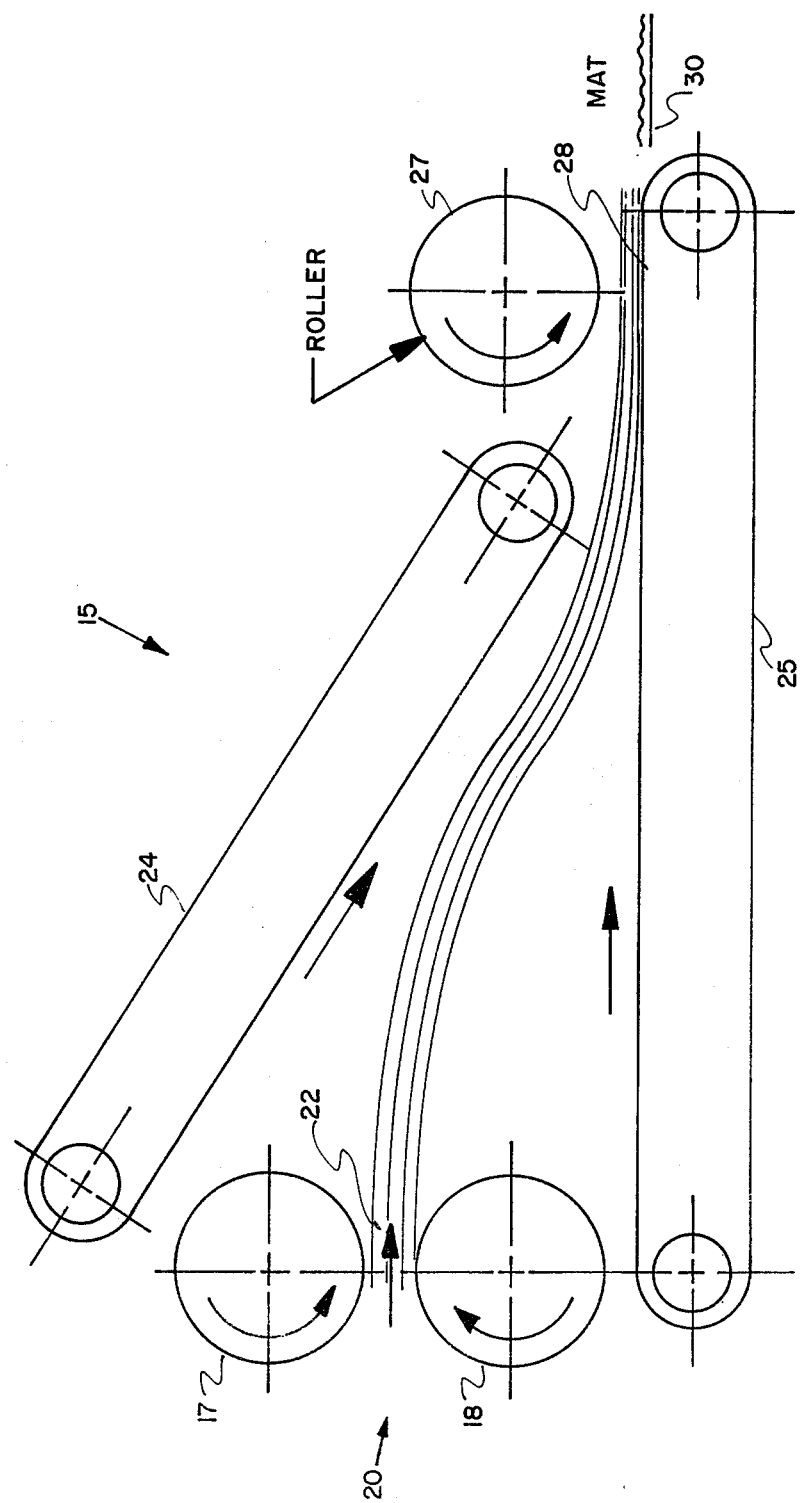
FIG. 1 is a side schematic view of the device of this invention for macerating products in forming the thus macerated products into a mat.

The device 15 of this invention includes a pair of movable means 17 and 18, shown in the drawings to include a pair of rotatable cylindrical rollers, at the inlet, or forward, end 20 of the device. Rollers 17 and 18, as shown schematically in FIG. 1, are mounted one above the other and rotated in opposite directions with the upper roller 17 being rotated counterclockwise and the lower roller 18 being rotated clockwise to thus establish a flow of agricultural products 22 between the rollers to macerate the products while passing between the rollers.

The products 22 are conveyed rearwardly from macerating rollers 17 and 18 between conveying belts 24 and 25. Upper conveying belt 24 extends rearwardly from above roller 17 and is preferably downwardly inclined from front to rear, as indicated in FIG. 1. Lower conveyor belt 25 extends rearwardly from below roller 18 and is preferably horizontal. As also indicated in FIG. 1, belts 24 and 25 may both be endless belts with the lower run of belt 24 and the upper run of belt 25 moving from the front to the rear of the device to thus direct products toward the rear of the device.

A mat forming cylindrical roller 27 is positioned above the rear end portion 28 of conveyor belt 25. Roller 27 is rotated counterclockwise and in conjunction with rear end portion 28 of belt 25 forms the macerated products into a mat 30.

Figure 2:
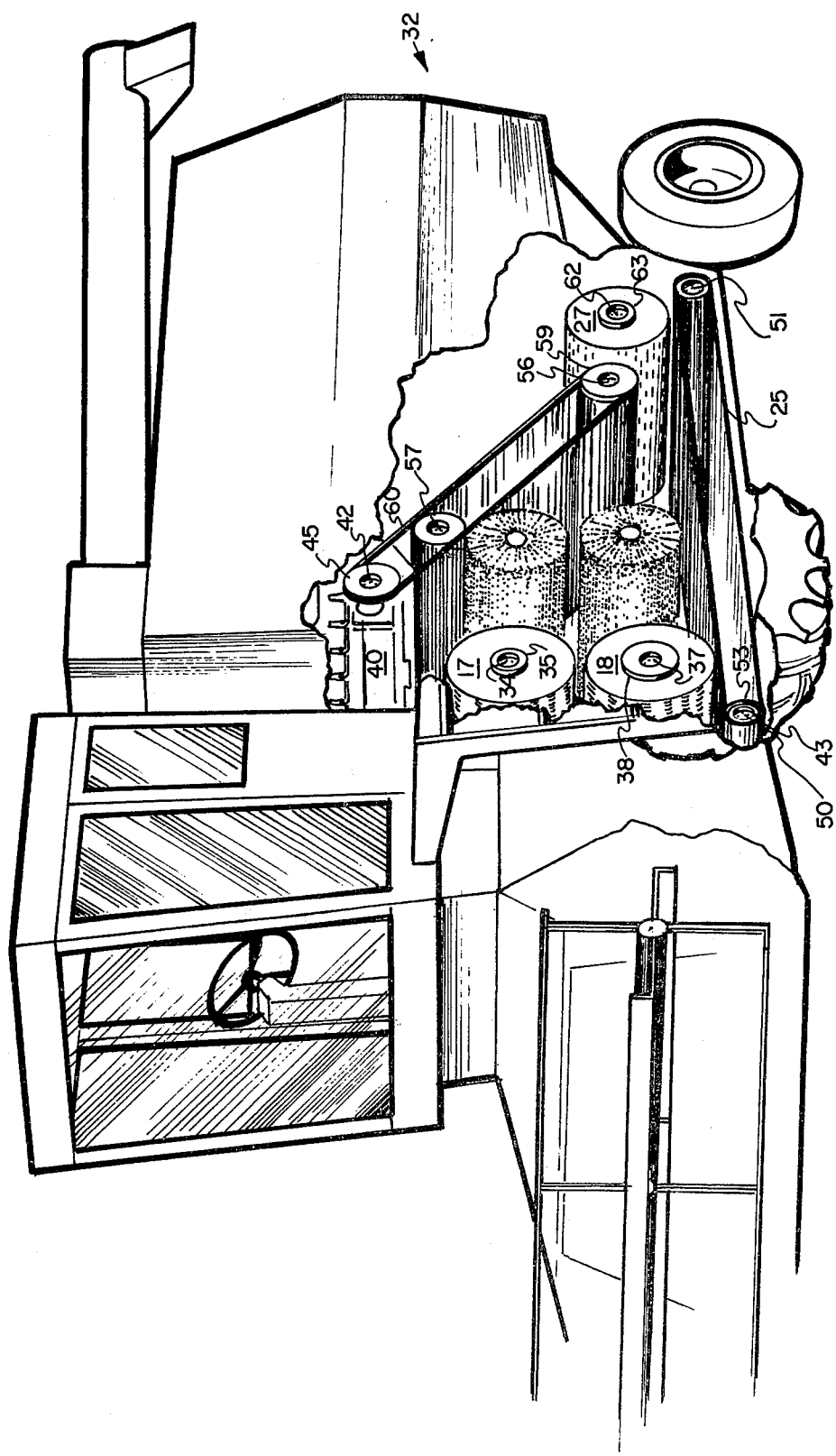
FIG. 2 is a perspective view of the device shown in FIG. 1 with portions cut away to illustrate elements of the device.

As shown in FIG. 2, the device 15 is preferably mounted as a part of a self-propelled machine 32. As shown, roller 17 is mounted on shaft 34 which shaft has a pulley 35 mounted thereon for rotating the shaft and roller. Roller 18 is mounted on shaft 37 below roller 17 and shaft 37 has a pulley 38 thereon for rotating the shaft and roller.

A prime mover 40 (such as a diesel engine, for example) provides power for the device (although other power resources can be utilized, of course, such as the power takeoff of a tractor or the like). Drive shaft 42 has pulleys, such as drive pulley 45 mounted thereon, for driving the driven pulleys (by belts not shown) to thereby drive pulley 35 to rotate shaft 34 (and hence roller 17), and drive pulley 38 to rotate shaft 37 (and hence roller 18). The sizes of the pulleys are chosen to obtain the speed of rotation differentiation between rollers 17 and 18 as desired (speed differential gearing could also be utilized, if desired).

Endless conveyor belt 25 is mounted on shafts 50 and 51 with shaft 50 having a pulley 53 mounted thereon. Drive shaft 42 drives pulley 53 by a belt (not shown) to rotate shaft 50 (and hence propel conveyor belt 25). Endless conveyor belt 24 is mounted on shafts 56 and 57 with shaft 56 having a pulley 59 mounted thereon. Pulley 45 is mounted on drive shaft 42 and drive belt 60 extends to pulley 59 to rotate shaft 56 (and hence propel conveyor belt 25).

Matting roller 27 is mounted on shaft 62, which shaft has a pulley 63 mounted thereon. Roller 27 is also driven by drive shaft 42 by an interconnected drive belt (not shown).

Figure 3:
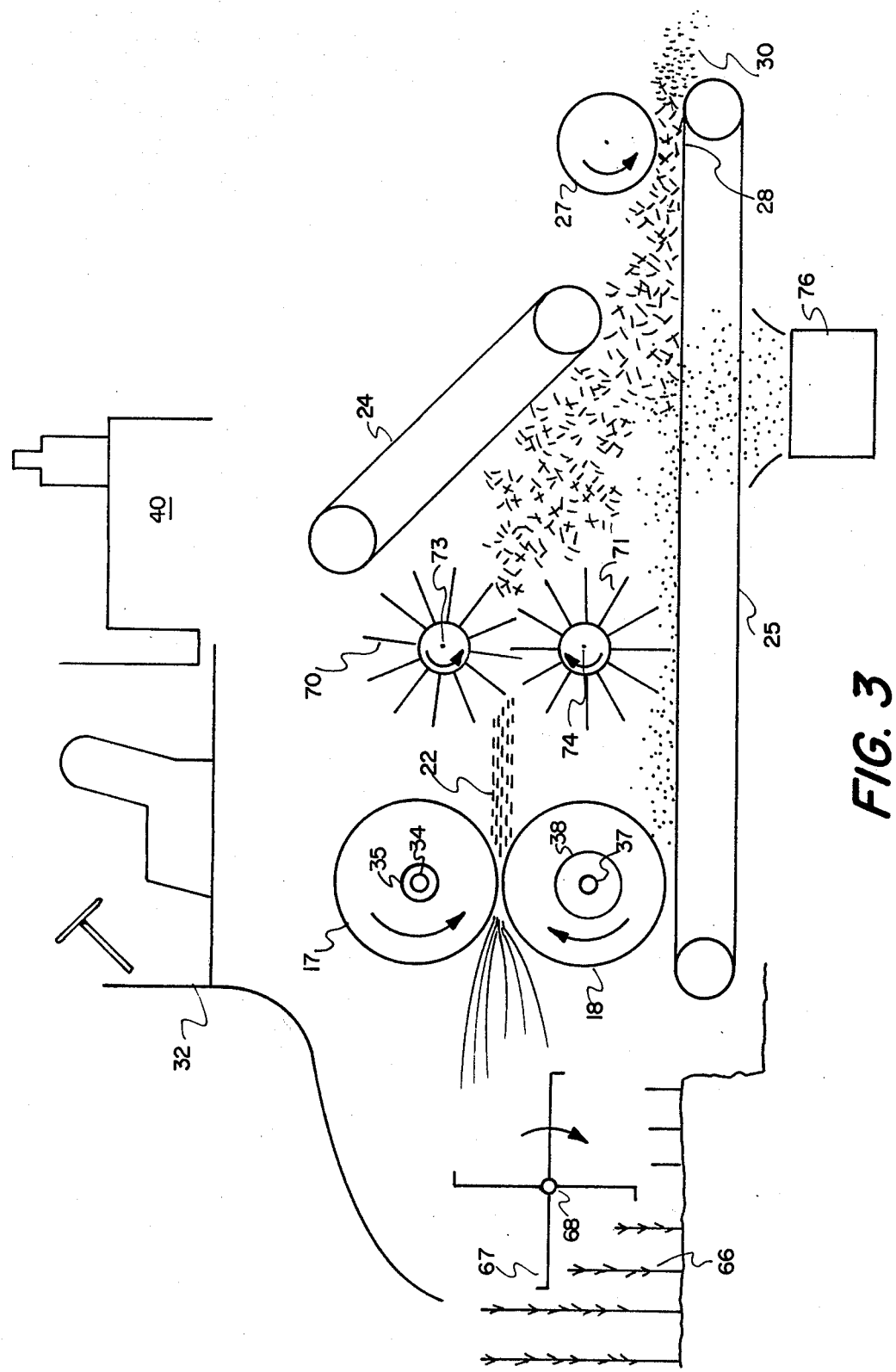
FIG. 3 is a side schematic view of an alternate embodiment of this invention.

In FIG. 3, an alternate embodiment of the invention is shown in schematic form. In this embodiment, macerating rollers 17 and 18 are utilized at the inlet portion of the device. In this embodiment, however, the agricultural products 66 are severed and fed to the inlet (i.e., between rollers 17 and 18) by flail intake 67 rotating about a shaft 68 (and propelled by prime mover 40 although not specifically shown in FIG. 3). The severed products are thrown rearwardly to the inlet and hence fed between the rollers as indicated in FIG. 3 where the products are macerated.

The macerated products are thrown rearwardly from the rollers past a pair of fluffer brushes 70 and 71 rotating in opposite directions about mounting shafts 73 and 74. Shafts 73 and 74 are rotatively driven by prime mover 40 although not specifically shown in FIG. 3. Belt 24 is mounted behind the fluffer brushes to direct macerated products 22 downwardly to belt 25. The rear portion 28 of belt 25 and matting roller 27 form the products into the mat 30 that is discharged from the device.

As indicated in FIG. 3, belt 25 also acts as a juice collector with the juice being collected at container 76 located below belt 25.

Figure 4:
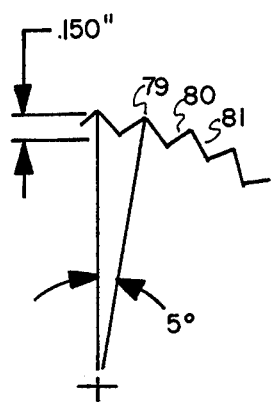
FIG. 4 is a side schematic view showing a portion of the macerating rollers to illustrate the tooth formation at the periphery of the roller.
Figure 5:
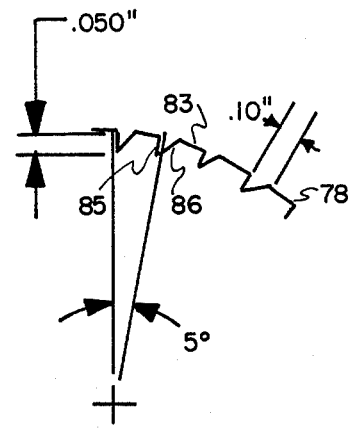
FIG. 5 is a side schematic view showing portions of the macerating rollers to illustrate an alternate embodiment of the tooth configuration at the periphery of the rollers.

The rollers 17 and 18 are preferably serrated with the tooth pattern either as shown in FIG. 4, or preferably, as shown in FIG. 5. In either case, the tooth pattern preferably extends entirely across the face, or periphery, 78 of the cylindrical rollers. As shown in FIG. 4, the teeth 79 are spaced about five degrees with the depth of the teeth being about 0.15 inches. The tooth pattern, as shown in FIG. 4, is formed by surfaces 80 and 81 of each tooth with the surfaces being joined to substantially form a right angle. However, the angle of surface intersection is a matter of design choice only, and each roller may even have raised ribs across its face with the ribs being either parallel with the axis of the roller or at an angle with it. As shown in FIG. 5, the depth of the teeth is about 0.05 inches with the teeth again being spaced about five degrees. The tooth pattern, as shown in FIG. 5, provides a large smooth curved area 83 at the periphery 78 of the roller with each tooth 84 having a first surface 85 extending substantially along a radius line of the roller and a second surface 86 that forms an acute angle with the first surface and extends to the curved area 82 (thus, a sharp notched tooth is formed). While it is preferred that the rollers both have a tooth configuration, one roller may be smooth and still function. By increasing the amount of peripheral surface area 78, an increase in maceration rate is realized.

Two sets of rollers with different tooth configurations were utilized (as shown in FIGS. 4 and 5). Both rollers in a set used identical tooth patterns, although runs with combinations of each type and with a smooth roller were run for observation. Each roller had a 12.75 inch outside diameter, and the top roller was rotated faster than the lower, with both being rotated in a direction to draw material into the device. The differential peripheral velocities create a shearing action on hay stems. At initial startup, it was observed that dry rollers tend to build up some juice which appears to help in a self clearing operation, and a test of protein losses due to roller maceration was performed by collecting all throughput material with the results showing a 0.7% difference between an input material of 24.9% to 24.2% output material. This difference is possibly due to the buildup of juices on the roller as they approach a steady state juicy condition. Utilization of a pair of smooth rollers was tried but such rollers, while macerating hay, would not feed material, and this led to development of the rollers shown in FIG. 5 with a large surface area at the periphery along with feeding grooves. As shown, the grooves have a relative right angle shear edge which oppose each other providing excellent shearing action along with differential peripheral velocities.

The device thus includes a macerating section where the product is macerated as is necessary for fast drying. A matting section may also be included to form a mat of the macerated products, and a section can be included to gather the macerated products prior to mat formation.

Figure 6:
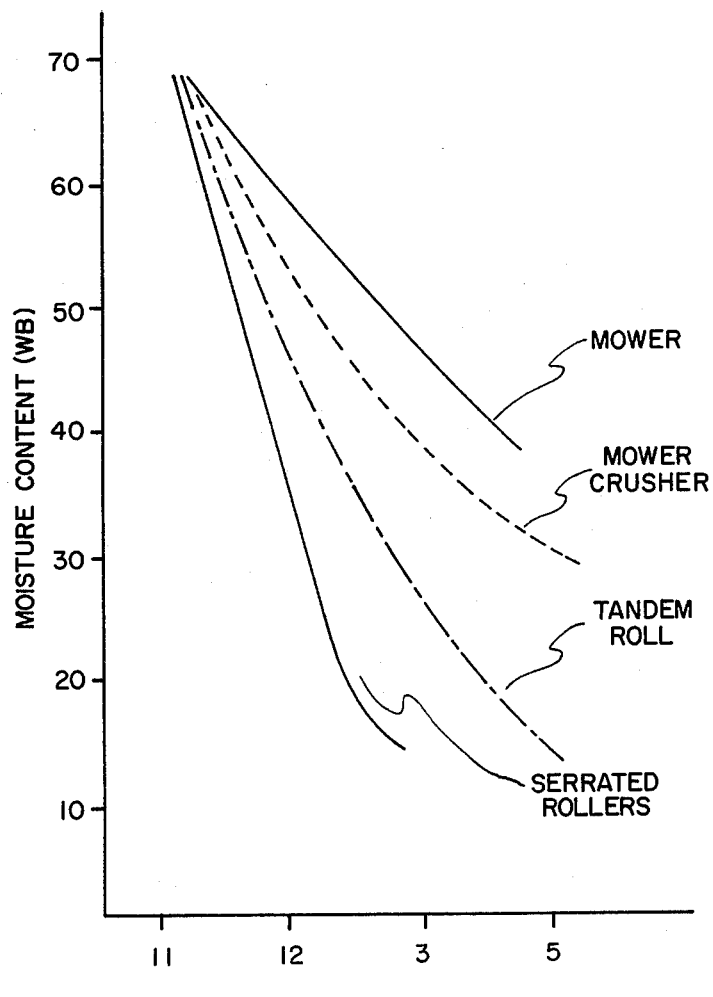
FIG. 6 is a graph showing drying time versus moisture content for various types of devices including the device of this invention.

The device is primarily intended for use with agricultural products such as forage products, and the embodiments shown are particularly useful for hay with the device improving hay quality by increasing the drying rate to achieve a fast dry harvest. With serrated rollers rotating at different speeds and with close spacing between the periphery of the rollers, as brought out hereinafter, the forage stems are sheared exposing more surface area and thus providing fast drying times as shown by the graph of FIG. 6 where other types of shearing are also graphically depicted. For a one foot wide cylindrical roller, the flow rate is: 100 pounds/minute or 3 tons/hour of wet material (75%). Assuming a five foot width of the rollers and a ten foot header cut, this device can therefore process 15 tons of material per hour.

Hay yielding two tons per acre dry or six tons per acre wet could then be mowed at a rate of 15 tons per hour times one acre per six tons equals 2.5 acres per hour. The speed of this device is then calculated as (2.5 acres/hour)×(8.25/10 ft)=2.2 mph (twice the roller width would double the ground speed).

The horsepower required for rollers with a design as shown in FIG. 4 with high yielding hay and a machine capacity of five acres per hour would be (5 acres/hour)×(6 tons/acre)=(30 tons/hour) which is (30 tons/hour)×(3 hp-hr/ton)=90 hp. The horsepower required for rollers with tooth design as shown in FIG. 5 (and thus providing high maceration) would be (30 tons/hour)×(5 hp-hr/ton)=150 hp.

The device tests were complete factorial experiments, that is, of the treatments applied, all were replicated with at least one observation at all the levels or at all the other treatments. The tests were also completely randomized designs and because the alfalfa used was regarded as being uniform in quality (size, moisture content, and all other factors that may effect observations) it was thought unnecessary to make random assignments of quantities of alfalfa to specific treatments. A two-way analysis of variance was computed. First, a two-way analysis of a variance was computed to investigate the effect of speed ratio and clearance on horsepower/hour per ton.

A three-way analysis of variance was also computed to test whether speed ratio, clearance and mass feed rate significantly affects net power. The results of this analysis of variance indicates:

1. The main effects of clearance and mass feed rates significantly affects net power (one can be 96.9% and 95.9% sure of this), speed ratio alone does not affect net power (with 52.6% certainty), and clearance and mass feed rate alone affect net power;

2. Although speed ratio does not affect net power, speed ratio together with clearance affects net power, while all the other interactions do not appear to be important; and 3. Speed ratio, clearance and mass feed rate altogether do not seem to affect net power (i.e., the three-way interaction does not seem important).

It can be concluded from this analysis of variance that:

1. Clearance and mass speed rate alone affect net power while speed ratio alone does not;

2. While speed ratio alone does not affect net power, speed ratio does combine with the effect of clearance to effect net power; and 3. The effect of speed ratio together with the effect of clearance and mass flow rate does not affect new power in a three-way interaction statistical analysis.

Thus the combination of factors which maximize net power are the mass feed rate and the combination of speed ratio and clearance.

Figure 10:
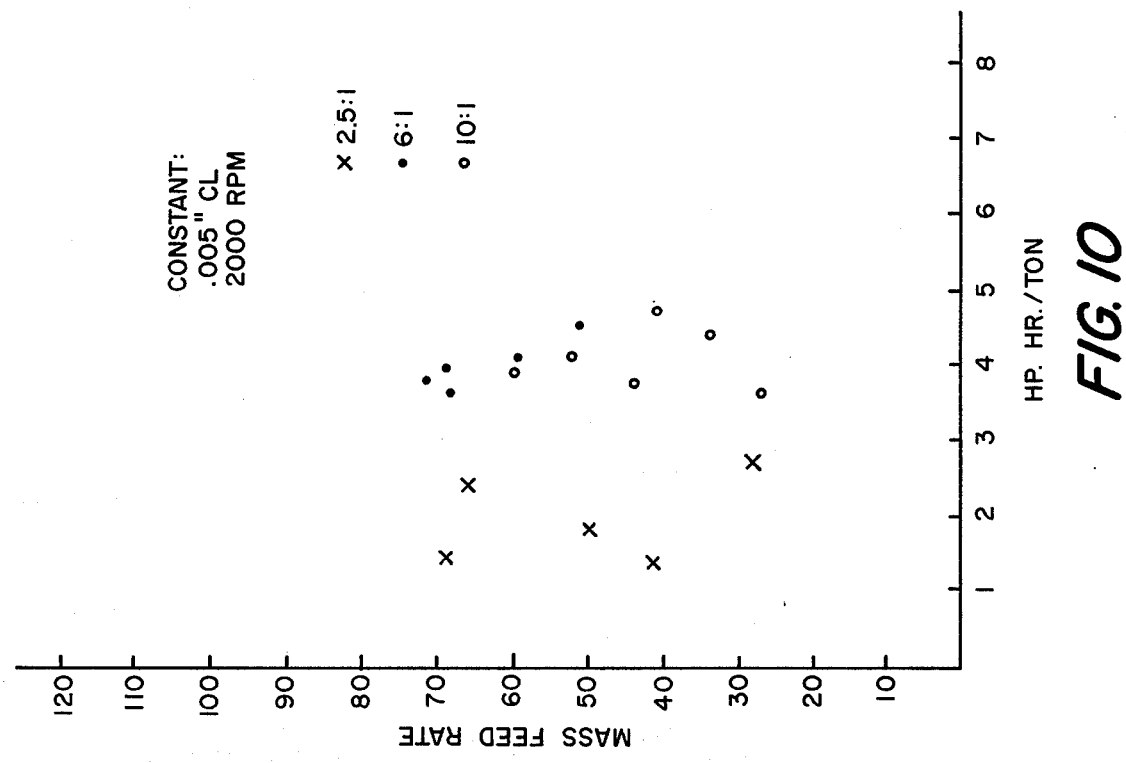
FIGS. 9, 10 and 11 are plots of clearance and speed ratio versus horsepower-hour/ton.
Figure 9:
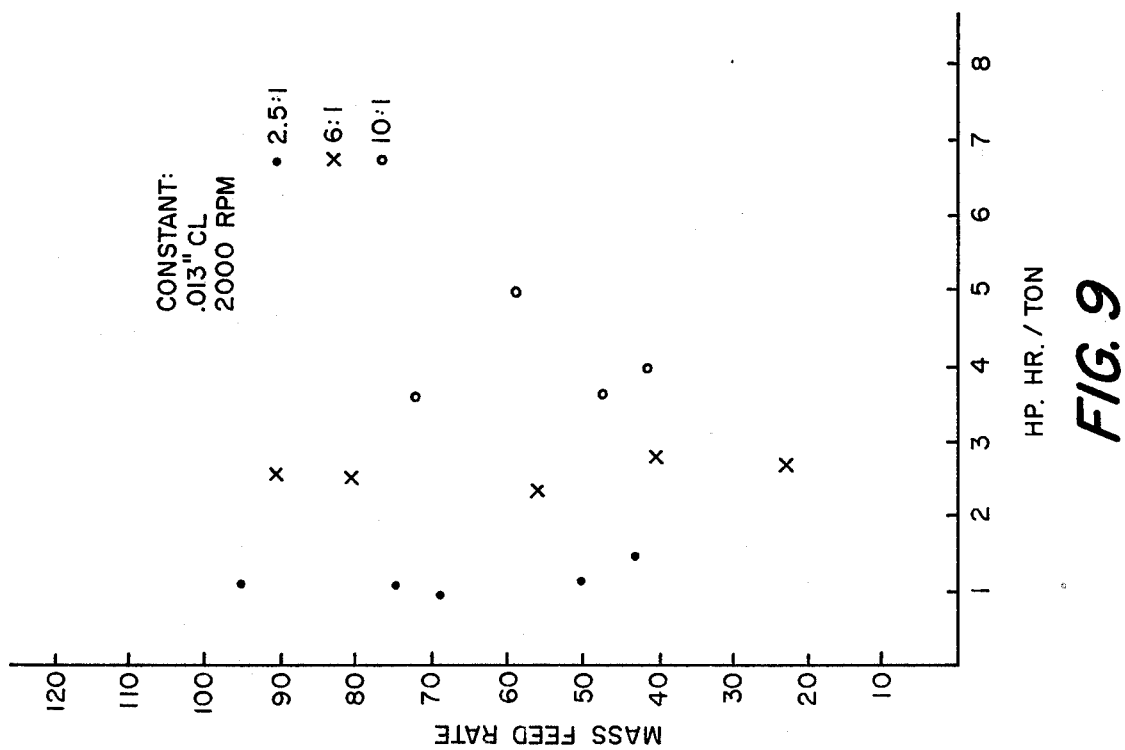
Figure 11:
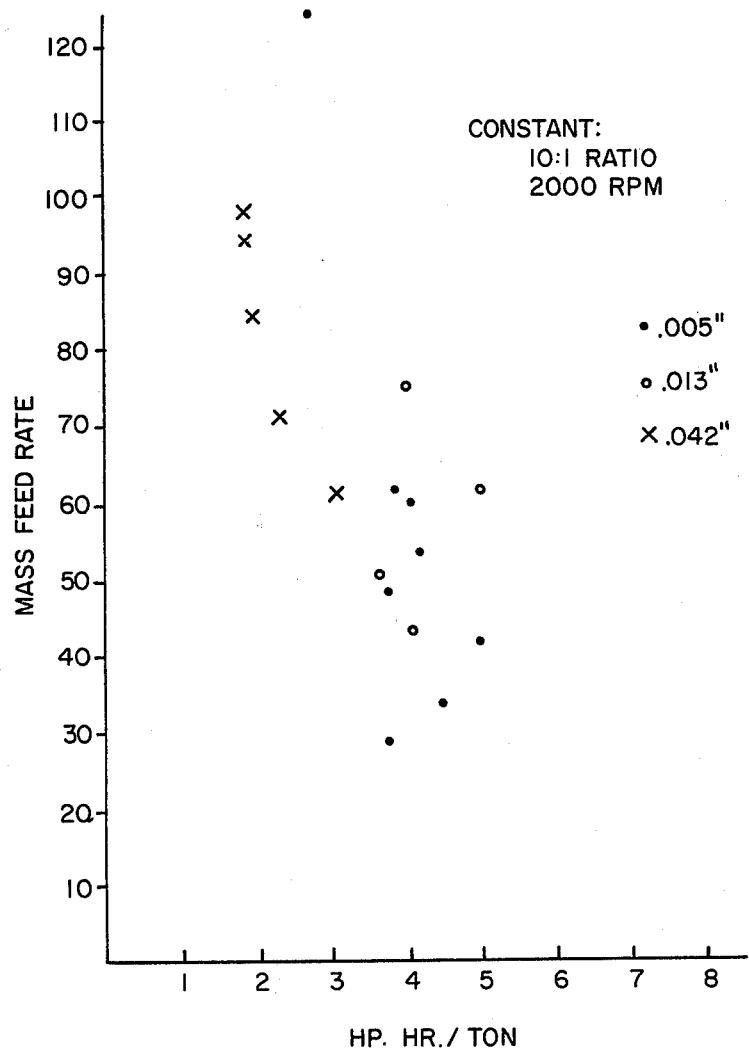

To maximize hp-hr/ton, a choice is made of the clearance which seems to maximize hp-hr/ton and the choice of speed ratio should be unimportant to hp-hr/ton. FIGS. 9, 10 and 11 are plots of clearance and speed ratio versus hp-hr/ton and bear out the above results of the analysis of variance.

The determination of optimum machine conditions for macerated hay thus included horsepower measurement and actual observations. Mass flow rate was varied by changing the input speeds. Other variables evaluated included a plurality of speed ratios (2.5:1, 6:1, and 10:1), roller speeds, roller clearances and roller types.

Using the device as depicted in FIG. 3, a number of runs were conducted and the results achieved were as follows:

| Date | Run # | Speed Ratio | No Load RPM | Mass Feed Rate lb/min | Clearance | Net Power/ Ft. of Width | HP-HR TON/ Ft. of Width | Type Material |
| --- | --- | --- | --- | --- | --- | --- | --- | --- |
| 8/17 | 81719 | 2.5:1 | 2000 | 43 | .013 | 2.08 | 1.612403 | (second crop) Alfalfa |
| " | 81720 | " | " | 69.5 | " | 2.79 | 1.338129 | " |
| " | 81721 | " | " | 74 | " | 3.2 | 1.441441 | " |
| " | 81722 | " | " | 50 | " | 2 | 1.333333 | " |
| " | 81723 | " | " | 94 | " | 4 | 1.433692 | " |
| " | 8171 | 10:1 | " | 45 | .013 | 7.82 | 5.792593 | Grass |
| " | 8172 | " | " | 35 | " | 4.83 | 4.83333 | " |
| " | 8173 | " | 2350 | 40.5 | " | 5.58 | 4.592593 | (second crop) Alfalfa |
| " | 8174 | " | " | 63 | " | 7.83 | 4.142857 | " |
| " | 8175 | " | " | 94 | " | 9.34 | 3.312057 | " |
| " | 8176 | " | " | 55 | " | 3.28 | 1.987874 | (second crop) Alfalfa Sec. time |
| " | 8177 | " | 1850 | 29 | " | 3.12 | 3.586207 | (second crop) Alfalfa |
| " | 8178 | " | " | 60 | " | 7.82 | 4.34444 | " |
| " | 8179 | " | " | 65 | " | 7.83 | 4.015385 | " |
| 8/12 | 8121 | 10:1 | 2000 | 71 | .013 | 7.76 | 3.643198 | (second crop) Alfalfa |
| " | 8124 | " | " | 42.5 | " | 5.02 | 3.937255 | " |
| " | 8125 | " | " | 48 | " | 5.32 | 3.694444 | " |
| 8/18 | 8181 | 10:1 | 2000 | 57 | .013 | 8.51 | 4.976608 | " |
| 8/17 | 81710 | " | 1850 | 61 | " | 8.55 | 4.672131 | " |
| " | 81711 | " | " | 39.5 | " | 5.08 | 4.28692 | " |
| " | 81712 | " | " | 50.5 | " | 3.54 | 2.336634 | (second crop) Alfalfa Sec. time |
| 8/17 | 81713 | 6:1 | 2000 | 39.5 | .013 | 3.62 | 3.054852 | (second crop) Alfalfa |

-continued

| Date | Run # | Speed Ratio | No Load RPM | Mass Feed Rate lb/min | Clearance | Net Power/ Ft. of Width | HP-HR TON/ Ft. of Width | Type Material |
|---|---|---|---|---|---|---|---|---|
| " | 81714 | " | " | 25.5 | " | 2.22 | 2.901961 | " |
| " | 81715 | " | " | 56.5 | " | 4.86 | 2.867257 | " |
| " | 81716 | " | " | 39.5 | " | 3.19 | 2.691983 | " |
| " | 81717 | " | " | 80 | " | 7.31 | 3.045833 | " |
| " | 81718 | " | " | 90 | " | 8.31 | 3.077778 | " |
| 8/16 | 8161 | 10:1 | 1700 | 36 | 0.13 | 5.81 | 5.37963 | " |
| " | 8162 | " | " | 32.5 | " | 5.4 | 5.538462 | " |
| " | 8163 | " | " | 19.5 | " | 2.52 | 4.307692 | " |
| " | 8164 | " | " | 37 | " | 6.34 | 5.711712 | " |
| 8/16 | 8165 | 10:1 | 2300 | 51 | .013 | 7.64 | 5.026144 | (second crop) Alfalfa |
| " | 8166 | " | " | 77 | " | 9.45 | 4.090909 | " |
| " | 8167 | " | " | 49 | " | 8.42 | 5.727891 | " |
| " | 8168 | " | " | 26.5 | " | 3.33 | 4.927858 | " |
| 8/8 | 8820 | " | 2000 | 56.5 | .005 | 5.04 | 1.982301 | (second crop) Alfalfa Sec. time |
| " | 881 | " | " | 29 | " | 3.31 | 3.804598 | (second crop) Alfalfa |
| " | 882 | " | " | 33.5 | " | 4.61 | 4.587065 | " |
| " | 883 | " | " | 40 | " | 5.65 | 4.708333 | " |
| " | 884 | " | " | 52.5 | " | 6.76 | 4.292063 | (second crop) Alfalfa |
| " | 885 | " | " | 59.5 | " | 7.13 | 3.994398 | " |
| " | 886 | " | " | 59 | " | 7.35 | 4.152542 | " |
| " | 887 | " | " | 46 | " | 5.39 | 3.905797 | " |
| " | 889 | " | " | 52.5 | " | 8.53 | 5.415873 | second time through |
| " | 8810 | " | " | 43.5 | " | 3.77 | 1.925926 | " |
| 8/9 | 8910 | 10:1 | 2000 | 60 | .042 | 3.21 | 1.783333 | (second crop) Alfalfa |
| " | 8911 | " | " | 69.5 | " | 4.74 | 2.273381 | " |
| " | 8912 | " | " | 91 | " | 5.71 | 2.091575 | " |
| " | 8913 | " | " | 92 | " | 5.66 | 2.050725 | " |
| " | 8914 | " | " | 83 | " | 5.84 | 2.212121 | " |
| 8/22 | 8221 | 2.5:1 | " | 35 | " | .68 | .647619 | (second crop) Alfalfa |
| " | 8222 | " | " | 60 | " | 1.65 | .9166667 | " |
| " | 8223 | " | " | 78 | " | 2.21 | .9444444 | " |
| " | 8224 | " | " | 56.5 | " | 1.3 | .7669617 | " |
| " | 8225 | " | " | 74.5 | " | 1.94 | .8680089 | " |
| 8/23 | 8231 | 6:1 | " | 30 | " | 1.75 | 1.944444 | " |
| " | 8232 | " | " | 45 | " | 3.84 | 2.844444 | " |
| " | 8233 | " | " | 60 | " | 5.08 | 2.8222222 | " |
| " | 8234 | " | " | 75 | " | 6.36 | 2.826667 | " |
| " | 8235 | " | " | 72.5 | " | 6.31 | 2.401149 | " |
| " | 8236 | " | " | 31 | .005 | 4.83 | 5.1935466 | " |
| " | 8237 | " | " | 51.5 | " | 7.4 | 4.789644 | " |
| " | 8238 | " | " | 68 | " | 7.81 | 3.82831 | " |
| " | 8239 | " | " | 71.5 | " | 8.42 | 3.925408 | (second crop) Alfalfa |
| " | 82310 | " | " | 68.5 | " | 8.43 | 4.10219 | " |
| " | 82311 | 2.5:1 | " | 29 | " | 2.61 | 3 | " |
| " | 82312 | " | " | 50 | " | 3.54 | 2.36 | (second crop) Alfalfa |
| " | 82313 | " | " | 68.5 | " | 4.44 | 2.160584 | " |
| " | 82314 | " | " | 70 | " | 3.87 | 1.595238 | " |
| " | 82315 | " | " | 41.5 | " | 1.98 | 1.590361 | " |

It was further found that plugged runs were encountered as follows:

| Run # | Mass Feed Rate | RPM | Clearance |
|---|---|---|---|
| 8166 | 154 | 2300 | .005 |
| 884 | 92 | 2000 | .005 |
| 8123 | 105 | 2000 | .042 |
| 8126 | 206 | 2000 | .013 |

A harvesting energy comparison for various degrees of maceration (machine device settings) is as follows:

|  | Cutting Only |
|---|---|
| Corn Silage (chopper) ¼" cut | $-.8-1.7 \frac{HP-HR}{TON}$ |
| Haylage (chopper) ¼" cut | $1-2.8 \frac{HP-HR}{TON}$ |
| Wis. Extruder-macerated material | $2-2.5 \frac{HP-HR}{TON}$ |
| Purdue Macerator | $.7-5.9 \frac{HP-HR}{TON}$ |
| Cardboard | $1840 \frac{HP-HR}{TON}$ |

Figure 7:
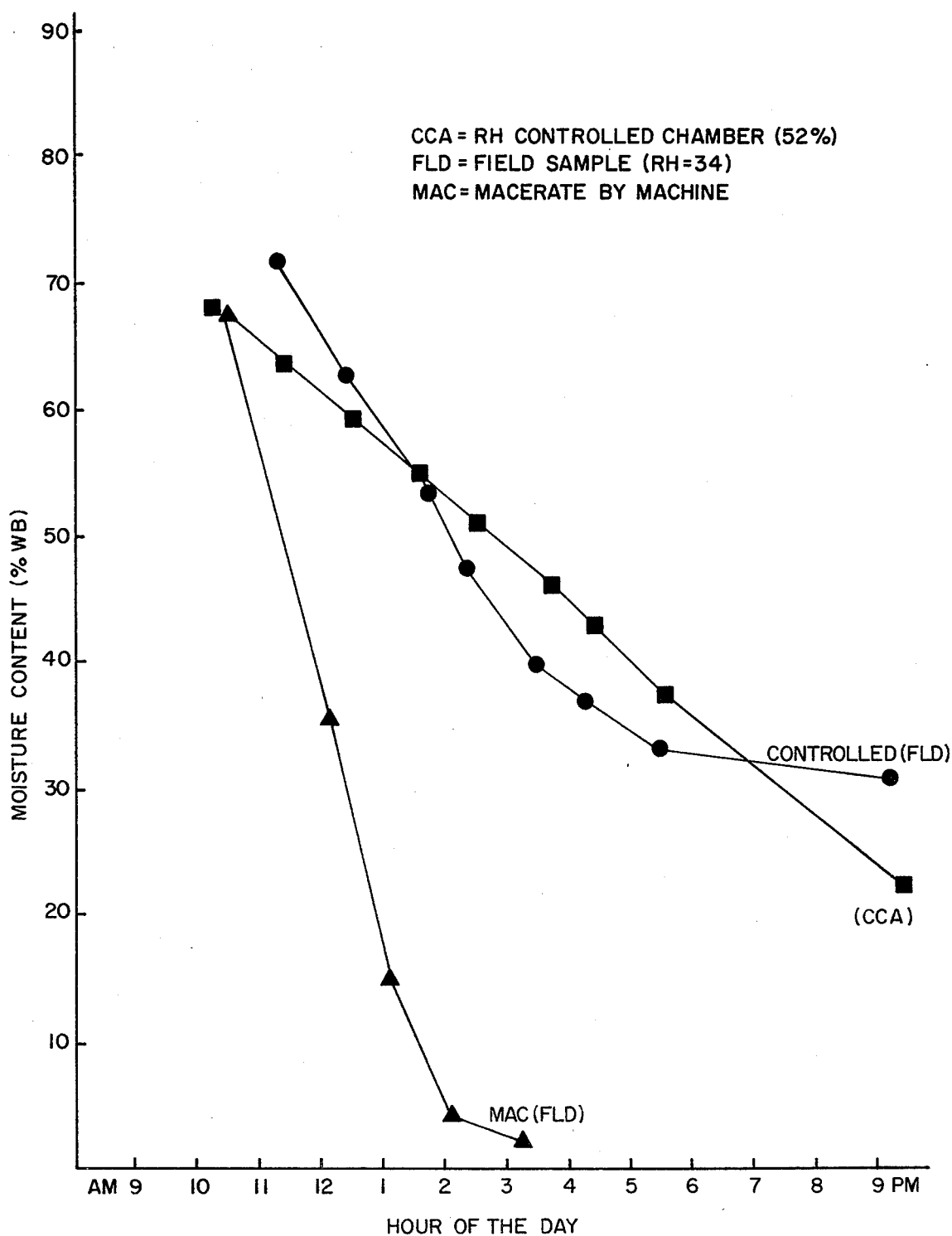
FIG. 7 is a plot of drying time versus moisture content.
Figure 8:
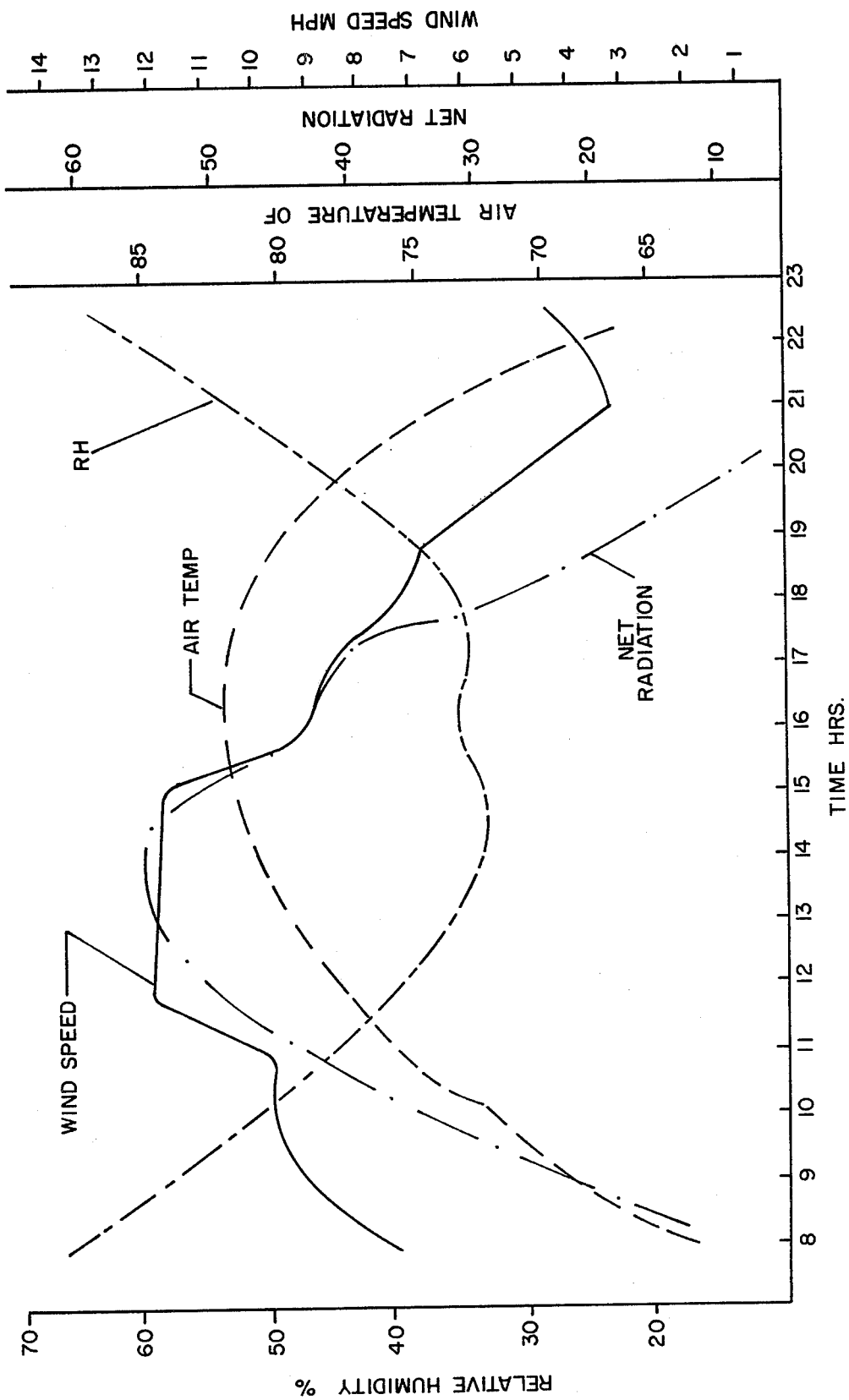
FIG. 8 is a graph of weather conditions.

Drying tests were standardized using a wire screen (1.7 square feet) containing a 300 g sample similar to 2.7 ton/acre dry matter yield was used. Drying rates were plotted as shown in FIG. 7, with daily weather conditions being as shown in FIG. 8.

From the foregoing, a number of conclusions can be drawn:

Rollers with teeth on the periphery as shown in either FIG. 4 or 5 running at differential speeds (2.5:1 or larger ratios) with clearances less than 0.050 inches will macerate hay to give near optimum drying rates (a test on June 29, 1977 with first crop hay required 2½ hours to dry in to 25% moisture with relative humidity=35, while a higher relative humidity day of 53 had a dry down of 4½ hours);

additional energy input can only decrease drying time (slightly) about 15 minutes;

where a 12.75 inch diameter roller is used, minimum top roller speed should be at least 1500 RPM and preferably at least 1750 RPM (because of the system's mass moment of inertia) to assure no plugging conditions for wet mass feed rates of about 3 lb/min;

the speed ratio between rollers has no appreciable effect on HP-HR/ton (as shown by the plot of FIGS. 9 and 10 and by three-way analysis of variance);

clearance does affect net power (as shown by the plot of FIG. 11 and the three-way analysis of variance);

little nutrient loss (0.7% protein) was observed if all roller through-put is collected;

rollers with teeth designed as shown in FIG. 5 with large curved areas give greater maceration providing a fine fibrous material that tends to interweave together in a mat;

faster rotation of rollers does allow greater mass flow rates;

higher mass flow requires more horsepower;

lower speed ratios give less net power and less shearing action;

greater clearances allow more material flow-through and less shearing action;

tight clearances (0.005 inches or less) between rollers are the best for providing a macerated mat) (some juices are left on the rollers during a high degree of maceration);

after some degree of maceration, drying rates are fairly fast;

second passes through the device required only about one-half of the original horsepower;

the use of serrated rollers shows more torn leaves and white stem stalk;

rollers with a tooth design as shown in FIG. 4 had 25% greater capacity for some settings;

grasses require higher horsepower than alfalfa;

rollers with a tooth design as shown in FIG. 4 with a 2.5:1 ratio between rollers and 0.013 inches clearance had a through-put of 94 lb/min with an energy input of 1.4 hp-hr/ton/foot of width;

rollers with a tooth design as shown in FIG. 5 with a 0.013 inches clearance and a through-put of 94 lb/min but with a 10:1 ratio between rollers required 3.3 hp-hr/ton/foot of width;

the belt conveyor system required about 0.1 hp/foot when passing materials through the mat roller;

mat density greater than about 300 g/1.7 sq ft reduced drying rates;

rollers with the tooth design of FIG. 4 appear to be better for crimping operation while rollers with tooth design of FIG. 5 appear to macerate well and show promise toward the theoretical paper-making type process;

rollers rotating at speeds as shown in the tests above are self-cleaning;

energy requirements for first-crop hay should exceed those of second-crop at similar feed and setting conditions;

with rough hand mat formation, material sticks together on stubble (field trial), after a rain, and during a baler pickup;

rollers of ratios of 6:1 and 10:1 show little change in degree of maceration; and brushes mostly plugged in all conditions.

Using the concept of cylindrical rollers running at high differential speeds to shred and separate forage and other agricultural products, many possible applications are available. This roller concept could, for example, be applied on a windroller-conditioner machine and improve drying rates with negligible damage to the materials, protein and other food value qualities of the macerated products. By changing the ratio, roller speeds, roller teeth, material flow rate, type of material, and clearances, minimum energy can be expended to achieve the degree of maceration needed.

In addition, this concept could be used on any type of forage crop or food process that needs to be shredded. Again, various degrees of maceration require specific settings, and for some products higher ratios (and a maximum of 10:1) might be beneficial.

While particular embodiments of the invention are shown, the invention is not meant to be limited thereto. For example, while the device is shown with rollers and conveyor belts, other configurations and/or positioning might be utilized, as might other brush and/or flail configurations, or even elimination of the brushes and/or flail.

In operation, the hay or other product is fed between the rollers and, as the product passes between the rollers, the stalk and leaf portions are sheared and shredded into short fiber segments. The thus macerated products are then gathered into a mass which is conveyed rearwardly to the matting roller (if utilized) where a mat is formed (to provide strength through stiffening sections via the matting roller) and the resulting mat is discharged from the device. Because the mat has had a greater percentage of the plant cells ruptured, its exposed surface area for drying rate by natural sun radiation and convection is increased so that the hay can be dried in a short period of time (for example, about three hours or so).

From the foregoing, it can be appreciated that this invention provides an improved device for improving product quality by reducing drying time. Where hay is the product, the hay can be cut, processed and dried in one day.

What is claimed is:

1. A device for maceration of agricultural products, said device comprising:
   first and second movable means having substantially horizontally extending portions with peripheries contiguous to one another for receiving agricultural products therebetween, said first movable means being mounted above said second movable means with one of said movable means moving at a different rate of speed than the other of said movable means whereby agricultural products received between said portions of said movable means are macerated while passing therebetween.

2. The device of claim 1 wherein said first and second movable means are rotatable cylindrical rollers having contiguous outer peripheries, and wherein the outer periphery of at least one of said rollers has smooth portions thereon.

3. The device of claim 1 wherein the periphery of at least one of said movable means has an irregular surface.

4. The device of claim 3 wherein said irregular surface includes a plurality of teeth having surfaces which are connected with one another at substantially a right angle.

5. The device of claim 3 wherein said irregular surface includes a plurality of substantially smooth cylindrical portions each of which has a notched portion therebetween.

6. The device of claim 5 wherein said first and second movable means are rotatable cylindrical rollers having contiguous outer peripheries, and wherein said notched portion includes a first surface extending substantially parallel to a radius line of one of said rollers and a second surface forming an acute angle with said first surface and extending outward therefrom to the cylindrical surface of said one roller.

7. The device of claim 1 wherein said agricultural products macerated by said device is hay.

8. The device of claim 1 wherein said device includes processing means for receiving said macerated agricultural products from said first and second movable means, and processing means forming a mat of said macerated agricultural products.

9. The device of claim 8 wherein said processing means includes a matting roller and first and second conveying means for causing said agricultural products from said first and second movable means to be conveyed to said matting roller.

10. The device of claim 1 wherein said device includes juice collecting means positioned to collect juice generated during maceration of said agricultural products by said first and second movable means.

11. A device for maceration of agricultural products, said device comprising:
    first and second rotatable cylindrical rollers the outer periphery of one of which has an irregular surface and the outer periphery of the other of which has a smooth surface, said outer periphery of said one roller being contiguous to the outer periphery of the other of said rollers, and said rollers being rotatable at different rates of speed with respect to one another whereby agricultural products received between said outer peripheries of said rollers are macerated while passing therebetween.

12. The device of claim 11 wherein said irregular surface of said one roller includes a plurality of substantially smooth cylindrical portions each of which has a notched portion therebetween.

13. The device of claim 12 wherein said notched portion includes a first surface extending substantially parallel to a radius line of said one roller and a second surface forming an acute angle with said first surface and extending outwardly therefrom to the cylindrical surface of said one roller.

14. The device of claim 11 wherein said rollers have substantially horizontally disposed axes with said axes being substantially vertically aligned with respect to one another.

15. The device of claim 11 wherein said device includes juice collecting means positioned to collect juice generated during maceration of said agricultural products by said rollers.

16. The device of claim 11 wherein said agricultural products macerated by said device is hay.

17. A device for maceration of agricultural products, said device comprising:
    a first cylindrical roller having an irregular peripheral surface;
    a second cylindrical roller having a peripheral surface;
    positioning means for positioning said first roller adjacent to said second roller with contiguous peripheral surfaces spaced from one another a distance no greater than about 0.05 inches; and
    drive means for causing rotation of said rollers in opposite directions and at different speeds and at a ratio of between about 2.5:1 and 10:1 whereby agricultural products received between said contiguous peripheral surfaces are macerated during passage between said surfaces.

18. The device of claim 17 wherein said first cylindrical roller has a serrated surface with said surface including teeth formed at right angles with respect to the periphery of said roller.

19. The device of claim 17 wherein said positioning means mounts said first roller above said second roller, wherein said device includes a matting roller spaced from said first and second roller, a first conveyor adjacent to first roller and downwardly inclined therefrom but towards said matting roller, and a second conveyor extending below said second roller and said matting roller whereby macerated agricultural products passing from said first and second rollers are conveyed to said matting roller where a mat is formed of said macerated products.

20. A device for treating forage products to enhance drying of said products, said device comprising:
    first means having an irregular movable surface;
    second means having a movable surface, said second means being positioned so that said movable surface of said first and second means are positioned with one of said surfaces above the other and closely adjacent thereto to receive and macerate forage products passing therebetween;
    conveying means for conveying macerated forage products from said first and second means; and
    matting means for receiving conveyed macerated forage products and forming a mat therefrom suitable to enhance drying of said products.

21. The device of claim 20 wherein said first and second means are cylindrical rollers, wherein said conveying means includes first and second conveyor belts with said first conveyor belt being positioned above said second conveying belt, and wherein said matting means includes a third cylindrical roller above said second conveying belt.

22. The device of claim 21 wherein said second conveying belt provides a juice collector.

23. The device of claim 21 wherein said device includes a pair of fluffer brushes between said first and second rollers and said first conveying belt.

24. The device of claim 21 wherein said device includes flail intake means for directing said forage products to said first and second rollers.

25. The device of claim 20 wherein said forage product is hay and wherein said hay is macerated and a mat formed therefrom to enhance drying of said hay in a short period of time.

26. The device of claim 25 wherein said hay is dried within a few hours of a single day.

27. The device of claim 26 wherein said hay is dried within a time period of between 2½ hours and 4½ hours.

28. The device of claim 25 wherein said device has a through-put of about 94 lb/min with an energy input of about 1.4 hp-hr/ton/foot of width.

29. The device of claim 20 wherein said matting roller forms a mat of said forage products with said mat having a density no greater than about 300 g/1.7 sq ft.

30. A device for treating hay to enhance drying, said device comprising:
a first cylindrical roller mounted for rotation, said first cylindrical roller having a serrated surface;
a second cylindrical roller mounted for rotation below said first cylindrical roller, and second cylindrical roller having a serrated surface with the surfaces of said rollers being spaced a distance no greater than about 0.05 inches whereby hay passing between said rollers is macerated thereat;
driving means for driving said first and second rollers at different speeds and at a ratio between about 1.5:1 and 10:1 with said first roller being 12.75 inches in diameter and rotated at a speed of at least 1500 RPMs;
a first conveyor belt rearwardly of said first and second rollers and downwardly inclined from front to rear;
a second conveyor belt below said second roller and extending rearwardly therefrom below said first conveyor belt, said second conveyor belt having a rear portion extending rearwardly from said first conveyor belt; and
a mat forming roller above said second conveyor belt and rearwardly of said first conveyor belt whereby hay macerated by said first and second rollers is formed into a fast drying mat when passing between said mat forming roller and said rear portion of second conveyor belt.

* * * * *